United States Patent Office 2,970,942
Patented Feb. 7, 1961

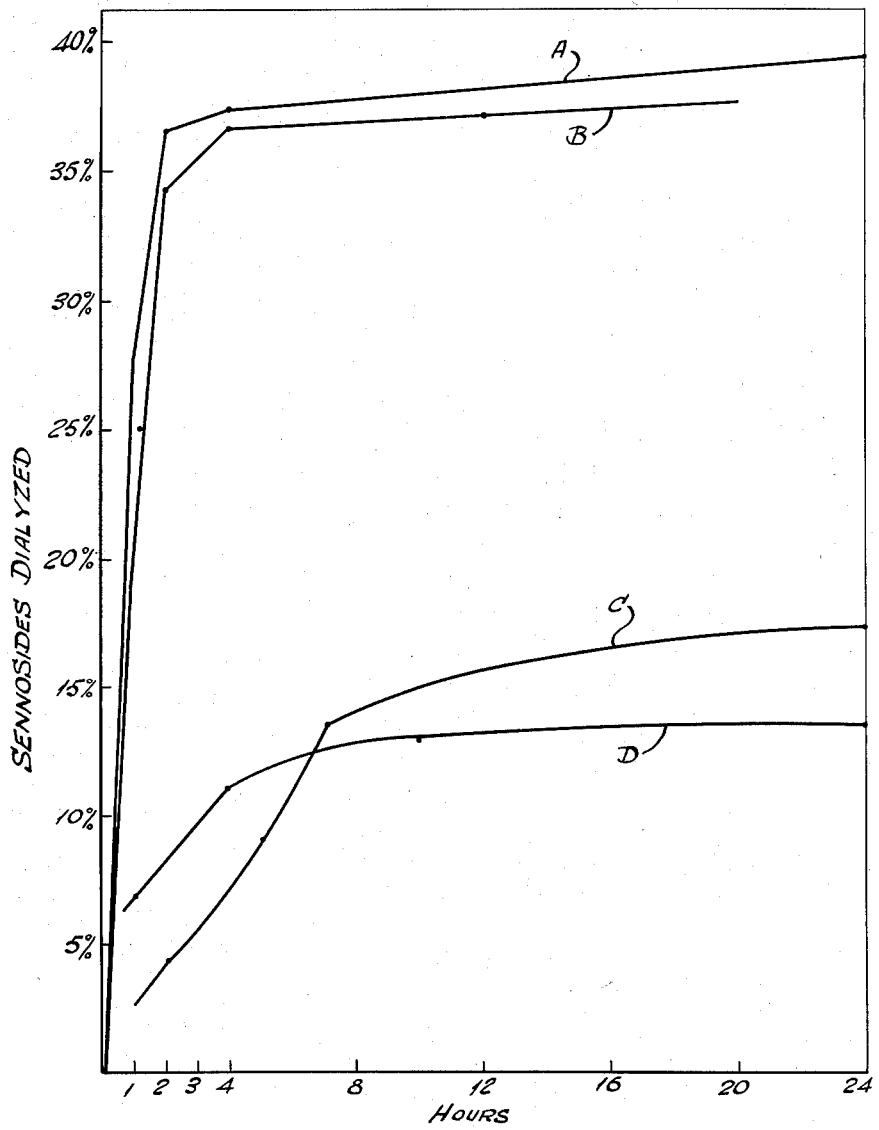

2,970,942
SENNOSIDE-POLYCYCLOHEXOSE COMPLEXES

Alfred Halpern, 11 Hampton Court, Great Neck, N.Y.

Filed Feb. 6, 1958, Ser. No. 713,651

16 Claims. (Cl. 167—56)

The present invention relates to a new and novel therapeutic agent which is capable of causing peristaltic stimulation and which is useful in the treatment of constipation. In particular, it is concerned with the molecular complex resulting from the inter-reaction between the glycosidal principles of senna and a polycyclohexose polymer, said polymer being exemplified by gum guar, polygalacturonic acid and alginic acid such polycyclohexose being capable of hydrogen bonding with the glycosidal principles of senna. The invention comprehends as well the method of preparation of the complex and its formulation into suitable and palatable dosage forms.

Cassia acutifolia (or Alexandria senna) and Cassia angustifolia (Tinnevelly senna) have been in use since biblical times as medicinal agents capable of causing a laxative effect in both humans and animals. The active principles which have been identified in recent years (see U.S. Patent No. 2,350,295) are water soluble anthraquinoidal glycosides which are sensitive to hydrolysis.

There are generally considered to be two principal glycosides in senna which cause a laxative effect, sennoside A and sennoside B, both of which have the same empirical formula, $C_{21}H_{20}O_{10}$, but differ in the manner of linkage of glucose to the aglycone portion of the molecule. The sennosides exert their therapeutic effect through a direct stimulation of Auerbach's plexus in the colonic tissue wall. They are first absorbed into the blood stream from the upper gastrointestinal tract and then re-excreted into the colon wherein the effect takes place.

Specimens of the Cassia family and particularly Cassia angustifolia and Cassia acutifolia which contain sennosides A and B, present them in varying proportions. Biologically, however, the effect of varying proportions of the two sennosides in senna extracts and preparations of the sennosides themselves is not significant because apparently the two act identically in the colon. What happens is that the glucose moiety is split off, as by digestion by E. coli and the aglycone moiety remaining is identical. This latter moiety is the active principle of senna. Hence from the point of view of the complexes described herein it matters not that the starting ingredient is sennoside A, sennoside B, a mixture of the same in varying proportions, or an extract of the senna plant. The terms "sennoside" and "sennosides," when not qualified are used herein to designate three biologically identical substances, i.e. sennoside A or sennoside B or mixtures of the two. When any of these are complexed with a polycyclohexose polymer, the resulting complex (provided the quantity of sennosides A and/or B is the same) will have the same biological effect.

Guar gum is a natural, vegetable colloid which is obtained from the refined endosperm separated from the hull and germ of the seed of Cyanopsis tetragonaloba. This gum is obtained as a dry, free-flowing, white powder which is stable indefinitely. Guar gum is a polysaccharide consisting of a complex polyglycose polymer of galactose and mannose. The non-ionic nature of the guar molecule is responsible for its unusual stability over virtually the entire pH range. A typical analysis of guar gum is as follows:

|  | Percent |
|---|---|
| Galactomannan content | 80 |
| Protein | 5 |
| Crude fiber | 2 |
| Ash | 0.8 |
| Ether extract | 0.6 |
| Arsenic | 0 |
| Heavy metals | 0 |
| Iron | Trace |

The straight chain nature of the guar molecule together with the regularity of its galactose branches causes an unusual hydrogen bonding effect. When added as a reagent, small quantities of the gum can alter the electrokinetic properties of a colloidal system due to its binding properties with hydrated mineral or carbohydrate surfaces.

Guar gum is not absorbed across the gastrointestinal mucosa and consequently contributes a bulking effect which may be desirable in the amelioration of certain forms of constipation. However, it does not have any stimulant properties on the colonic neuromusculature, and consequently cannot cause peristaltic stimulation necessary to initiate bowel activity.

When the active principles of senna (sennosides) are caused to react with guar gum in aqueous, alcoholic or hydroalcoholic media, a molecular complex is formed through hydrogen bonding, which markedly alters the absorbability of the sennosides without interfering with their pharmacologic activity in the large colon. Thus, it is possible, through the formation of this complex, to prevent the absorption of the glycosides across the upper gastrointestinal tract and yet to preserve their desirable physiologic activity on the colon. The advantage of this lack of absorption into the blood stream resides in the fact that the entire dose which is administered is utilized for its primary purpose (that is, peristaltic stimulation) and none is excreted through the kidneys. Hence there is no need to determine patient idiosyncrasies related to kidney excretion. The utilization of a full dosage means that less active material needs to be administered, thereby affording the clinician a better means of adapting the therapeutic regimen to meet the patient's needs.

It has been found that the colloidally complexed glycosides do not dialyze across a membrane as do the uncomplexed sennosides. The complex is stable to both the pH of the stomach and intestinal tract. Upon reaching the large intestines, enzymes, afforded by the bacterial flora of the gastrointestinal tract, serve to decompose and reverse the complex, thereby freeing the active principles to exert their physiologic and therapeutic effect. See the curves set forth in the drawing which illustrate these facts quantitatively.

When it is desired to administer this compound to humans and to employ the same in veterinary medicine, it is preferred that it be taken in the form of either tablets or capsules.

The following examples illustrate the scope of the present invention:

Example 1

One part of guar gum is mixed with the purified glycosides extracted from Cassia acutifolia or Cassia angustifolia (sennosides A and B) in amounts ranging from 0.2 percent to 1.0 percent, based upon the quantity of guar gum utilized. All reactants are combined to form a homogeneous mixture and to this is added 500 parts of 50 percent isopropanol. The mixture is stirred at room temperature for ten minutes and concentrated under reduced pressure to a paste. The paste is air dried and granulated to a 20-mesh size. The dried powder is ground to 60-mesh size and then oven dried at 45° C.

The resultant sennoside-guar-gum complex is a homogeneous, creamy white colored powder which assays in good agreement with the theoretical values for sennosidal content indicating stability of the sennoside content. However, the usual extractive technique for the analysis of glycosides is not applicable because of the molecular complex formed, which interferes with the separation of the normally soluble glycosides. Upon the addition of water to this powder, a viscous solution is obtained which does not have the bitter nauseating taste of the sennosides.

When this complex is dialyzed against distilled water, artificial gastric juice or artificial intestinal juice, interference with the passage of the sennosides across the membrane is readily discernible. Thus, in Fig. 1 there is illustrated the dialysis curves of the sennoside-guar-gum complex in artificial gastrointestinal juices both before and after incubation with and hence digestion by *E. coli*. Curve A is a control curve which illustrates the dialysis curve for the untreated sennosides (senna glucosides) in an aqueous solution of the pH of 6. Curve B illustrates the dialysis curve for the sennoside-guar-gum complex after two hours of incubation with *E. coli*. Curve C illustrates the dialysis curve for the said complex in artificial gastric juice (U.S.P.) while curve D illustrates the said curve for the said complex in artificial intestinal juice (U.S.P.). The particular sennoside used was contained in a solid extract (concentrate) from *Cassia acutifolia* obtained in accordance with the procedures described in British Patent No. 683,990 (1956) and Canadian Patent No. 540,082 (1957). The curves amply establish that the normal dialysis behavior of the sennosides has been altered through the formation of the molecular complex, sennoside-guar-gum complex.

However, when this complex is incubated with *E. coli*, the principal microbial organism found in the large intestines, a reversal of this complex is obtained and the sennosides rapidly diffuse across the membrane.

*Example 2*

In place of the guar gum there may be substituted, wholly or in part, polygalacturonic acid or alginic acid, in which case there are obtained sennoside-polygalacturonate complex and sennoside-alginate complex, respectively. When polygalacturonic acid is used, it is preferred that a ratio of ten parts for each part of total sennosides A and B be employed. The alginic acid is used in equal amounts to that described for the guar gum.

*Example 3*

In place of the sennosides A and B utilized in Example 1, there may be substituted the solid or fluid extract of *Cassia acutifolia* or *Cassia angustifolia*, prepared by the conventional techniques employed for the manufacture of the general class of galenicals called extracts. If the concentrated solid-extract is used, the amount used is based upon the sennosidal content and equivalent glycosidal quantities to that described in Example 1 are employed. If the fluid-extract is used, it must also be employed in equivalent quantities based upon the sennosidal content. However, when the fluid extract is utilized, the granulation step may be avoided since the alcohol content of the fluid extraction is sufficient to permit the molecular reaction with resultant complex formation.

*Example 4*

In place of the isopropanol used in Example 1 there may be substituted an ethanol-water mixture in a ratio of from 40 to 70 parts of ethanol for each 100 parts of alcohol water solution.

*Example 5*

In place of the isopropanol used in Example 1 there may be substituted water or any other lower aliphatic alcohol (i.e. one having from one to six carbons), or a mixture of such lower alcohol and water.

*Example 6*

When it is desired to utilize these complexes in clinical medicine, they may be dispensed in the form of tablets, capsules or granules for oral administration, or combined with suitable carriers and molded into a suppository for rectal administration.

When it is intended to prepare tablets of the complexes no binder is required and only a dispersing agent need be added in order to assure a pharmaceutically desirable tablet. Capsules may be prepared by directly filling a gelatin capsule of proper size adapted to the intended dose. When a granule is desired, the complexes are mixed with suitable diluents, coloring and flavoring and passed through a screen of from eight to twenty mesh utilizing an alcohol-water granulating solution. Homogeneous granules are obtained which are suitable for dispersion in an aqueous fluid such as water, fruit juice or milk. Suppositories are prepared by incorporating the appropriate quantity of a complex (based on its glycosidal content) with sufficient cocoa butter or any other suitable suppository base. The mass is either molded or compressed into suppositories weighing two grams each.

The use of the complexes in clinical medicine requires that from five to twenty mg. of the sennoside be administered, depending upon the age and need of the patient. It is preferred that the medication be given at bedtime in order that the full pharmacologic effect be exerted in the morning upon arising. Thus, it is important that the unit for dispensing (viz. tablet, capsule, granule or suppository) be adjusted in sennosidal content so that this dosage schedule may be conveniently achieved. It is preferred that each tablet contain the equivalent of 10 mg. of the sennoside; each capsule contain either 5 or 10 mg. of the sennoside; each teaspoonful of granules contain 10 mg. of the sennoside; and each suppository contain 10 mg. thereof It is not desired to be limited except as set forth in the following claims, the above description being by way of illustration of the invention.

What is claimed is:

1. Sennoside-polycyclohexose-polymer complex in which hydrogen bonding exists between said polycyclohexose and sennoside, said complex having colloidal properties in aqueous media.
2. Sennoside-guar-gum complex.
3. Sennoside-polygalacturonate complex.
4. Sennoside-alginate complex.
5. The method of preparing the sennoside-polycyclohexose-polymer complex described in claim 1 which consists of reacting a first moiety selected from the group consisting of sennosides A and B, a solid extract of senna and a fluid extract of senna, with a polycyclohexose polymer having colloidal properties when dispersed in water and capable of hydrogen bonding with the sennosides in the first moiety, in a medium selected from the group consisting of water, a lower alkyl alcohol and mixtures of the same.
6. The method of preparing sennoside-guar-gum complex which consists of reacting a first moiety selected from the group consisting of sennosides A and B, a solid extract of senna and a fluid extract of senna, with guar gum, in a medium selected from the group consisting of water, a lower alkyl alcohol and mixtures of the same.
7. The method of preparing sennoside-polygalacturonate complex which consists of reacting a first moiety selected from the group consisting of sennosides A and B, a solid extract of senna and a fluid extract of senna, with galacturonic acid, in a medium selected from the group consisting of water, a lower alkyl alcohol and mixtures of the same.
8. The method of preparing sennoside-alginate complex which consists of reacting a first moiety selected from the group consisting of sennosides A and B, a solid extract of senna and a fluid extract of senna, with alginic acid, in a medium selected from the group consisting of water, a lower alkyl alcohol and mixtures of the same.

9. A laxative in unit dosage form comprising a pharmaceutical carrier and sennoside-polycyclohexose-polymer complex as described in claim 1 in which the sennosidal content equals from 5 through 20 mg.

10. A laxative in unit dosage form comprising a pharmaceutical carrier and sennoside-guar-gum complex in which the sennosidal content equals from 5 through 20 mg.

11. A laxative in unit dosage form comprising a pharmaceutical carrier and sennoside-polygalacturonate complex in which the sennosidal content equals from 5 through 20 mg.

12. A laxative in unit dosage form comprising a pharmaceutical carrier and sennoside-alginate complex in which the sennosidal content equals from 5 through 20 mg.

13. The method of administering a sennoside in a manner to prevent absorption in the upper gastrointestinal tract, which consists of first complexing said sennoside with a polycyclohexose polymer having colloidal properties when dispersed in water and capable of hydrogen bonding with said sennoside and then orally introducing the resulting complex.

14. The method of administering a sennoside in a manner to prevent absorption in the upper gastrointestinal tract, which consists of first complexing said sennoside with guar gum and then orally introducing the resulting complex.

15. The method of administering a sennoside in a manner to prevent absorption in the upper gastrointestinal tract, which consists of first complexing said sennoside with polygalacturonic acid and then orally introducing the resulting complex.

16. The method of administering a sennoside in a manner to prevent absorption in the upper gastrointestinal tract, which consists of first complexing said sennoside with alginic acid and then orally introducing the resulting complex.

References Cited in the file of this patent

UNITED STATES PATENTS

| | | |
|---|---|---|
| 2,043,204 | Spalding | June 2, 1936 |
| 2,170,921 | Bye | Aug. 29, 1939 |
| 2,403,707 | Cunningham | July 9, 1946 |
| 2,566,291 | Reichstein | Aug. 28, 1951 |